United States Patent
Sambamurthy et al.

(10) Patent No.: US 9,659,041 B2
(45) Date of Patent: May 23, 2017

(54) MODEL FOR CAPTURING AUDIT TRAIL DATA WITH REDUCED PROBABILITY OF LOSS OF CRITICAL DATA

(75) Inventors: Govinda Raj Sambamurthy, Bangalore (IN); Hari Charan Ramachandra Rao, Bangalore (IN); Viswanath Pasupuleti, Kadapa (IN)

(73) Assignee: Oracle International Corporation, Redwood Shores, CA (US)

( * ) Notice: Subject to any disclaimer, the term of this patent is extended or adjusted under 35 U.S.C. 154(b) by 118 days.

(21) Appl. No.: 13/360,822

(22) Filed: Jan. 30, 2012

(65) Prior Publication Data

US 2013/0198138 A1 Aug. 1, 2013

(51) Int. Cl.
G06F 17/30 (2006.01)
G06F 11/34 (2006.01)

(52) U.S. Cl.
CPC .... G06F 17/30309 (2013.01); G06F 11/3476 (2013.01)

(58) Field of Classification Search
USPC .................................. 707/648, E17.046, 703
See application file for complete search history.

(56) References Cited

U.S. PATENT DOCUMENTS

| | | | |
|---|---|---|---|
| 5,032,979 A | | 7/1991 | Hecht et al. |
| 6,079,000 A | * | 6/2000 | Cooper et al. ................ 711/162 |
| 7,200,777 B1 | * | 4/2007 | Bouchee .......................... 714/45 |
| 7,233,956 B2 | * | 6/2007 | Balducci et al. |
| 7,395,436 B1 | | 7/2008 | Nemovicher |
| 7,707,642 B1 | | 4/2010 | Herbach et al. |
| 8,296,534 B1 | * | 10/2012 | Gupta et al. .................. 711/162 |
| 2004/0158475 A1 | * | 8/2004 | Juzeszyn et al. ................ 705/1 |
| 2005/0193035 A1 | * | 9/2005 | Byrne .......................... 707/202 |
| 2006/0179482 A1 | * | 8/2006 | Alcazar et al. ................ 726/22 |
| 2007/0050366 A1 | | 3/2007 | Bugir et al. |
| 2008/0281960 A1 | * | 11/2008 | Schibler ....................... 709/224 |
| 2009/0319772 A1 | * | 12/2009 | Singh et al. .................. 713/153 |
| 2010/0017536 A1 | * | 1/2010 | Colvig et al. ................ 709/238 |
| 2010/0131545 A1 | * | 5/2010 | Srivastava et al. ........... 707/769 |

(Continued)

OTHER PUBLICATIONS

Laserfiche Audit Trail, Automate the Monitoring and Reporting on Business Processes, http://www.laserfiche.com/en-us/Products/Audit-Trail , Copyright 2011, pp. 1-2.

(Continued)

*Primary Examiner* — Heather Herndon
*Assistant Examiner* — Soheila (Gina) Davanlou
(74) *Attorney, Agent, or Firm* — Iphorizons PLLC; Narendra Reddy Thappeta (57) ABSTRACT

An aspect of the present invention provides for capturing of audit trail data related to processing of requests. In an embodiment, the received requests are classified into a first category and a second category. For each request in the first category, the corresponding audit trail data is stored directly into non-volatile storage upon processing of the request. On the other hand, for each request in the second category, the audit trail data is first stored into a volatile memory upon processing of the request, and then later copied from the volatile memory to non-volatile storage. Thus, the audit trail data corresponding to both categories of requests is eventually available stored on non-volatile storage.

12 Claims, 4 Drawing Sheets

(56) References Cited

U.S. PATENT DOCUMENTS

| | | | |
|---|---|---|---|
| 2010/0161919 A1* | 6/2010 | Dodgson et al. | 711/161 |
| 2010/0185693 A1* | 7/2010 | Murty et al. | 707/803 |
| 2010/0228764 A1* | 9/2010 | Sallakonda | G06F 17/3051 707/769 |
| 2010/0250623 A1* | 9/2010 | Manis et al. | 707/809 |
| 2010/0274962 A1* | 10/2010 | Mosek et al. | 711/113 |
| 2011/0246444 A1 | 10/2011 | Jenkins et al. | |

OTHER PUBLICATIONS

Cincom ECM, Security, Audit Trail and Supervision, http://ecm.cincom.com/cincom-ecm/solution-overview/ , Copyright 2011, pp. 1-3.

Cincom ECM, Solution Overview, http://ecm.cincom.com/cincom-ecm/solution-overview/security-audit-trail-and-supervision/ , Copyright 2011, pp. 1-3.

Ademero, Inc., Content Central™ Document Management Software, http://www.ademero.com/ , Downloaded circa Nov. 20, 2011, p. 1-1.

* cited by examiner

MODEL FOR CAPTURING AUDIT TRAIL DATA WITH REDUCED PROBABILITY OF LOSS OF CRITICAL DATA

BACKGROUND OF THE INVENTION

Technical Field

The present disclosure relates to capturing of audit trail data, and more specifically to models and techniques for capturing audit trail data with reduced probability of loss of critical data.

Related Art

Audit trail is often maintained in relation to processing of various requests. In general, digital processing systems perform a corresponding task specified in each request, while audit trail data is captured to represent various aspects of processing of the request. Some examples of captured information include the data representing the occurrence of the request, computing resources consumed for processing the request, electronic objects accessed, user or system from which the request is received, completion time of the request, timestamp of the request etc. However, audit trail data can include any information of interest, as suited for the corresponding environment and type of request, as is well known in the relevant arts.

Capturing of audit trail data is generally required to meet one or more requirements, suitable for the corresponding environment. One requirement in an environment is that, the approach ensure that critical audit data be captured reliably, or at least there is reduced probability of loss of such critical audit data. It is generally required that such a requirement be met without substantially impacting the processing of regular requests.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention provides for capturing of audit trail data related to processing of requests. In an embodiment, the received requests are classified into a first category and a second category. For each request in the first category, the corresponding audit trail data is stored directly into a non-volatile storage upon processing of the request. On the other hand, for each request in the second category, the audit trail data is first stored into a volatile memory upon processing of the request, and then later copied from the volatile memory to the non-volatile storage. Thus, the audit trail data corresponding to both categories of requests is available stored on non-volatile storage.

In an embodiment, the first category includes more critical requests compared to those in the second category. According to an aspect, the more critical requests include write requests and less critical requests comprise read requests, whereby the audit data corresponding to write requests is immediately stored in the non-volatile storage upon processing of the corresponding request, and the audit data corresponding to read requests is first stored only in a volatile memory upon processing of the corresponding request, and later transferred in a batch mode to non-volatile storage.

According to another aspect, the non-volatile storage contains a first database system and a second database system. The first database system is implemented based on a schema without constraints and the second database system is implemented based on a schema which enforces constraints (primary/foreign key constraints). The audit data for the critical requests are first stored in the first database system and later transferred to the second database system. The audit data for the non-critical requests is also transferred from the volatile memory to the second database system, such that the entire audit data is eventually available from a single database system for generating reports.

Thus, the audit data for the critical requests is captured in the first database system with less processing requirements, and then captured in the second database system with comparative more processing requirements (to enforce the constraints). On the other hand, for non-critical requests, the initial resource requirement is further reduced since the audit data is captured only into a volatile memory (RAM). Additional resources are expended to transfer the audit data to the second database system, thereby providing corresponding level of reliability. The processing resources are used efficiently since consumption of resources (upon processing of the corresponding requests) is reduced by using RAM for the non-critical requests, and by using the database system without constraints for the critical requests.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
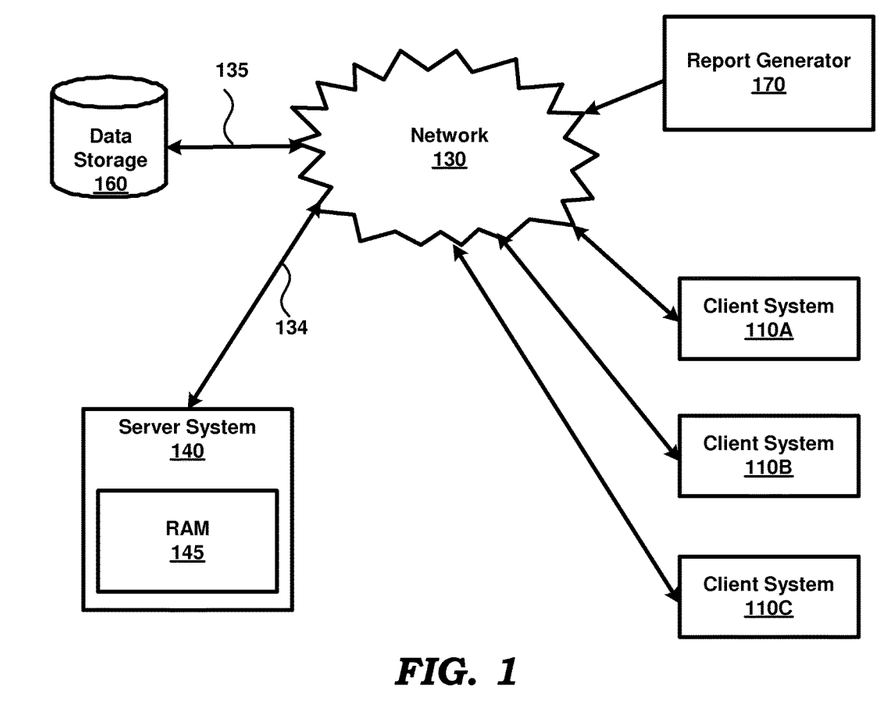
FIG. 1 is a block diagram illustrating an example environment in which several aspects of the present invention can be implemented.

FIG. 1 is a block diagram illustrating an example environment in which several aspects of the present invention can be implemented. The diagram is shown containing client systems 110A-110C, network 130, server 140, data storage 160, and report generator 170. Merely for illustration, only representative number/type of devices and systems are shown in FIG. 1. Many environments often contain many more systems, both in number and type, depending on the purpose for which the environment is designed. Each block of FIG. 1 is described below in further detail.

Network 130 provides connectivity between server system 140 and clients 110A-110C, report generator 170 and data storage 160, server system 140 and data storage 160. Network 130 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. A (IP) packet is said to be directed to a target system when the destination IP address of the packet is set to the (IP) address of the target system, such that the packet is eventually delivered to the target system by network 130. When the packet contains content such as port numbers, which specifies the target application, the packet may be said to be directed to such application as well. Network 130 may be implemented using any combination of wire-based or wireless mediums.

Each of clients 110A-110C sends the requests in the form of packets directed to server system 140 on network 130. Each client system may correspond to a personal computer system, tablet system, mobile phone, work station, etc., as will be apparent to one skilled in the relevant arts by reading the disclosure herein.

Data storage 160 represents a non-volatile (persistent) storage facilitating storage and retrieval of data by applications executing in server system 140. Data storage 160 may contain multiple storage units, each providing a corresponding non-volatile storage. Some of such storage units may provide for storage and retrieval of data using structured queries such as SQL (Structured Query Language). Alternatively, or in addition, some of the storage units may be implemented as a respective file server providing storage and retrieval of data in the form of files organized as one or more directories, as is well known in the relevant arts. Thus, data storage 160 may contain various electronic objects that are required for processing the requests received from client systems 110A-110C. In addition, data storage 160 provides for storage of audit trail data as well.

Report generator 170 processes the audit trail data stored in data storage 160 over the network 130 on path 135, and generates reports suitable for examination by auditors (or other human beings). Report generator 170 may generate queries in the form of SQL (directed to SQL databases) to retrieve relevant data of interest from data store, in generating the reports.

Server system 140 executes various user applications, which process corresponding requests received on path 134. The generated results may be sent on network 130 via path 134 to the client system to which the response is to be delivered. RAM (random access memory) 145 represents a volatile memory used by various applications executing in server system 140. As used in the present application, volatile memory represents RAM (or CAM) type storage units, which have several addressable locations (unlike registers which are used typically in CPUs or other processing elements), suitable for storing many records.

Server system 140 may capture audit trail data related to at least some of such requests. In general, the audit trail data is to be stored in non-volatile storage (e.g., in data storage 160) to complete capturing of the audit trail data over network 130 on path 134 and 135. It should be appreciated that there are several resources (e.g., computing resources, paths to various storage components, etc.) that are shared for both processing of requests and for capturing of audit trail data related to the requests. Accordingly, there are often scenarios (typically in busiest durations in which requests are received) when server system 140 may not have sufficient resources to both process the requests and complete capturing of the audit trail data.

Several aspects of the present invention address at least some of the requirements and/or problems noted above.

3. Reliable Capture of Audit Trail Data

Figure 2:
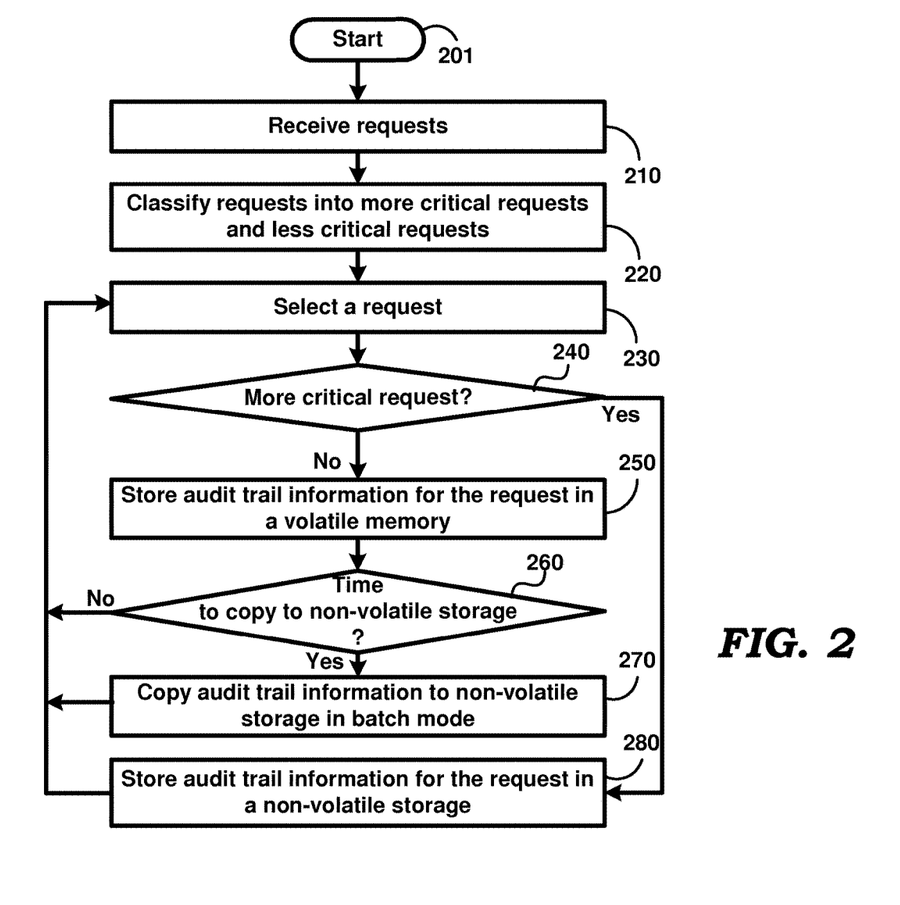
FIG. 2 is a flowchart illustrating the manner in which audit trail data is captured, in an embodiment of the present invention.

FIG. 2 is a flowchart illustrating the manner in which audit trail data is captured reliably, in an embodiment of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein. The flow chart begins in step 201, in which control immediately passes to step 210.

In step 210, server system 140 receives requests for processing. Each request may specify the desired task to be performed. Performance of the task may entail usage of appropriate processing resources, storage resources, etc. Control then passes to 220.

In step 220, server system 140 classifies the received requests into two categories—critical requests and non-critical requests. While the flow chart is described as classifying into only two categories, it should be appreciated classification into more categories is within the scope and spirit of several aspects of the present invention. Furthermore, the classification of requests into critical and non-critical categories (or higher and lower priorities) can be based on any criteria, as suited in the specific environment. In one embodiment, write requests (which cause data to be stored/modified) and read requests directed to confidential objects are classified as critical requests, and the remaining read requests are classified as non-critical requests. Control then passes to step 230.

Steps 230-280 operate to process each of the classified requests. It should be appreciated that such processing often occurs in parallel to steps 210 and 220, though shown as sequential step for ease of understanding. Similarly, some of the steps of 230-280 may also be performed in parallel, as will be apparent to one skilled in the relevant arts by reading the disclosure provided herein.

Thus, server system 140 selects a request to process in step 230. Such selection can be based on any criteria such as first-come-first-serve or according to any prioritization approach, as will be apparent to one skilled in the relevant arts by reading the disclosure provided herein.

In step 240, server system 140 determines whether the selected request is a critical request or non-critical request, according to the determination of step 230. Control passes to step 280 in case of critical requests and to step 250 otherwise.

In step 250, server system 140 stores audit trail information for the request in a volatile memory, for example, RAM 145. Thus, the audit trail information for non-critical requests is stored in RAM 145 upon (around the time of) processing of the corresponding requests. By storing the information in the volatile memory, the information is preserved for further processing in future. Furthermore, the processing resources required in the immediate future are also conserved, since storage into a RAM requires minimal processing resources as well.

In step 260, server system 140 determines whether it is time to copy data from RAM 145 to a non-volatile storage. Such time can be determined based on various considerations such as the time elapsed since previous copying, the amount of memory (within RAM 145) already used (either for the audit trail data stored in step 250 or the aggregate memory usage by all applications together), etc. Control passes to step 270 if it is determined that the information from RAM 145 is to be copied to a non-volatile storage and to step 230 (where a next request is selected) otherwise.

In step 270, server system 140 copies the audit trail information from RAM 145 to non-volatile storage (e.g., data storage 160) in batch mode, i.e., the audit trail information related to several requests may be copied in (substantially) successive processing cycles. It may thus be appreciated that there is some risk that audit trail data is not preserved, for example, if server system 140 goes down before the data is copied in step 270, but such a risk may be acceptable since the data at risk is non-critical. The locations in the RAM storing such data, can thereafter be reused, implying removal of data after copying, and thus copying may also be viewed as transferring of the data to data storage 160. Control then passes to step 230.

In step 280, server system 140 immediately stores audit trail information for the critical request in a non-volatile storage (e.g., data storage 160). In case of external systems such as data storage 160, storing entails sending the data in appropriate format (e.g., SQL queries) to cause the data to be eventually stored in data storage 160. However, internal units (e.g., secondary storage) can also be used as the non-volatile storage. Thus, without substantial delay (as for non-critical requests), the audit trail data is immediately stored in the non-volatile storage. The critical data is thus captured reliably upon processing of the corresponding requests. Control then passes to step 230 for processing the next request.

It may thus be appreciated that the critical data is captured reliably, while the non-critical data is sought to be captured with lesser immediate processing overhead. Yet, the audit trail information for the non-critical requests is captured into non-volatile storage, when the corresponding (processing and other) resources are possibly available at a later suitable time. Thus, server system 140 may be able to timely process requests, without being substantially affected by the audit trail capture requirements.

The approaches thus described may be implemented in several environments. The implementation in an example environment is described below in further detail.

4. Example Implementation

Figure 3:
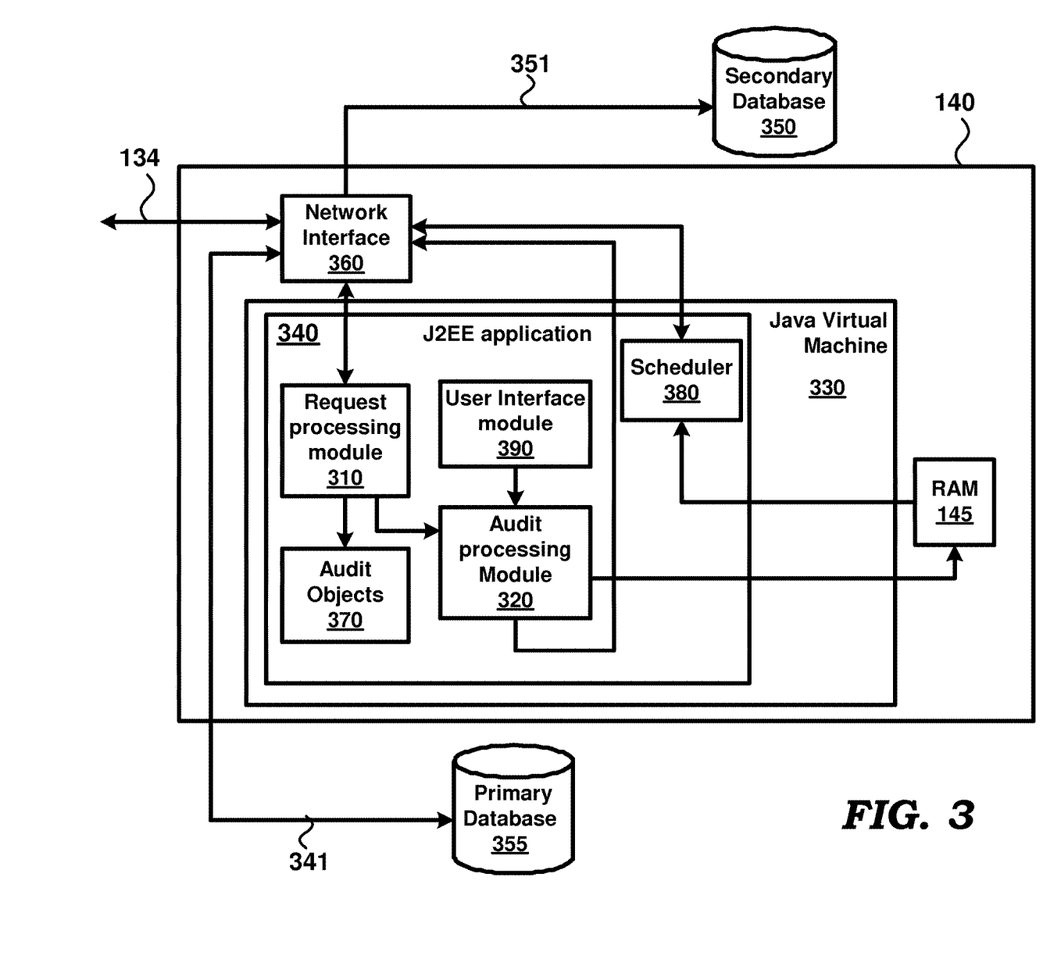
FIG. 3 is a block diagram illustrating the details of an example computing system in which several aspects of the present invention are implemented.

FIG. 3 is a block diagram illustrating the details of implementation of an example embodiment. The block diagram is shown containing primary database 355, secondary database 350 and the details of server system 140. Server system 140 is shown containing network interface 360, RAM 145 and JVM (Java Virtual Machine) environment 330. JVM 330 is in turn shown containing J2EE Application 340, which in turn has various modules (scheduler 380, request processing module 310, audit objects 370, user interface module 390, and audit processing module 320). Each block of FIG. 3 is described below in further detail.

Each of primary and secondary databases 355/350 represents a database operable using SQL queries, and thus represents a non-volatile storage as well. Primary database 355 is designed to store audit trail information using a schema, defined without constraints (e.g., foreign key constraints, etc.). Due to the absence of such constraints, the audit trail data is quickly (with minimal processing requirements) stored in primary database 355. As described in sections below, scheduler 380 operates to transfer the data therefore to secondary database 350, which has a schema defined to enforce constraints.

Though the constraints are not enforced in primary database 355, the columns are chosen such that each row is ensured to be unique, for example, by virtue of the electronic objects accessed, user or system from which the request is received, completion time of the request, timestamp of the request, etc., (and thus having an implicit primary key), and accordingly transfer to secondary database 350 does not cause loss of information. Thus, the two databases may be viewed as being part of data storage 160. Furthermore, the two databases can potentially be implemented in a single database management system, as corresponding tables/schemas. Path 341 may also be viewed as being a part of paths 134 and 135.

Network interface 360 provides the physical, electrical and protocol interfaces to enable server system 140 to send and receive IP packets on each of paths 134, 341 and 351. Each packet thus may relate a request or response.

Audit objects 370 represent various electronic objects (e.g., documents, software code files, libraries, email communications, application data, etc.) accessed during processing of requests. Though the objects are shown internal to server system 140, it should be appreciated that some of the objects can be external to the server system (e.g., within a database system such as primary database 355).

Request processing module 310 receives and processes each request. The result generated by processing such requests is sent via network interface 360. It may be appreciated that some of the requests cause audit objects 370 to be accessed (either as read or write operations).

User interface module 390 provides a convenient user interface (e.g., Graphical user interface) using which a user can specify the aspects of request processing that are to be captured as audit trail information/data, and the manner in which the captured data is to be classified. For ease of understanding, it is assumed that a user specifies that write requests and read access to specific audit objects 370 (e.g., confidential data) are to be treated as critical requests and the rest as non-critical requests. The user may further specify various parameters for operation of scheduler 380, as described in sections below. The user specified information may be stored in the form of configuration files in a non-volatile storage, for example, as XML data.

Audit processing module 320 forms the audit information with respect to requests processed by request processing module 310. Thus, audit processing module 320 may be implemented with appropriate interfaces to request processing module 310 (and other components of server system 140, including the operating system, etc.) to identify the requests and the corresponding attributes of interest (e.g., whether read or write request, the processing resources consumed, the arrival time, completion time, request timestamp, etc.). The implementation of audit processing module 320 to identify such attributes depends on the specific environment, and will be apparent to one skilled in the relevant arts by reading the disclosure herein.

Audit processing module 320 further operates based on the user specified parameters noted above with respect to user interface module 390. In particular, the critical and non-critical requests are identified and the corresponding audit trail information is processed as described above with respect to steps 280 and 250 respectively. The audit trail information for non-critical requests is stored in RAM 145 and that related to critical requests is stored in primary database 355. To store the audit trail information for critical requests, audit processing module 320 may send the corresponding data in the form of appropriate SQL queries.

Scheduler 380 operates in accordance with the parameters specified by user interface 390 in transferring the data in RAM 145 and primary database 355 to secondary database 350 (using network interface 360). As noted above, the configuration data may indicate when it is appropriate to copy data in RAM 145 to secondary database 350 (as described above with respect to step 260). When it is deemed to be appropriate (i.e., suitable duration) in accordance with the user specified parameters, scheduler 380 transfers the data in RAM 145 to secondary database 350 via network interface 360 using appropriate SQL queries.

Similarly, scheduler 380 may determine when it is appropriate to transfer the data stored in primary database 355 to secondary database 350 using network interface 360. Appropriate SQL queries may be issued to both the databases to effect the transfer of data.

Thus, it should be appreciated that the critical data is stored with less processing requirements (due to absence of enforcement of constraints) into primary database 355, and thereafter transferred to secondary database 350 at a time when the resources are available in abundance. As the audit trail data for both critical and non-critical requests available in secondary database 350, report generator 170 can generate reports by interfacing with secondary database 350 alone.

The description is continued with respect to a digital processing system in which several features are operative when the corresponding executable modules are executed.

5. Digital Processing System

Figure 4:
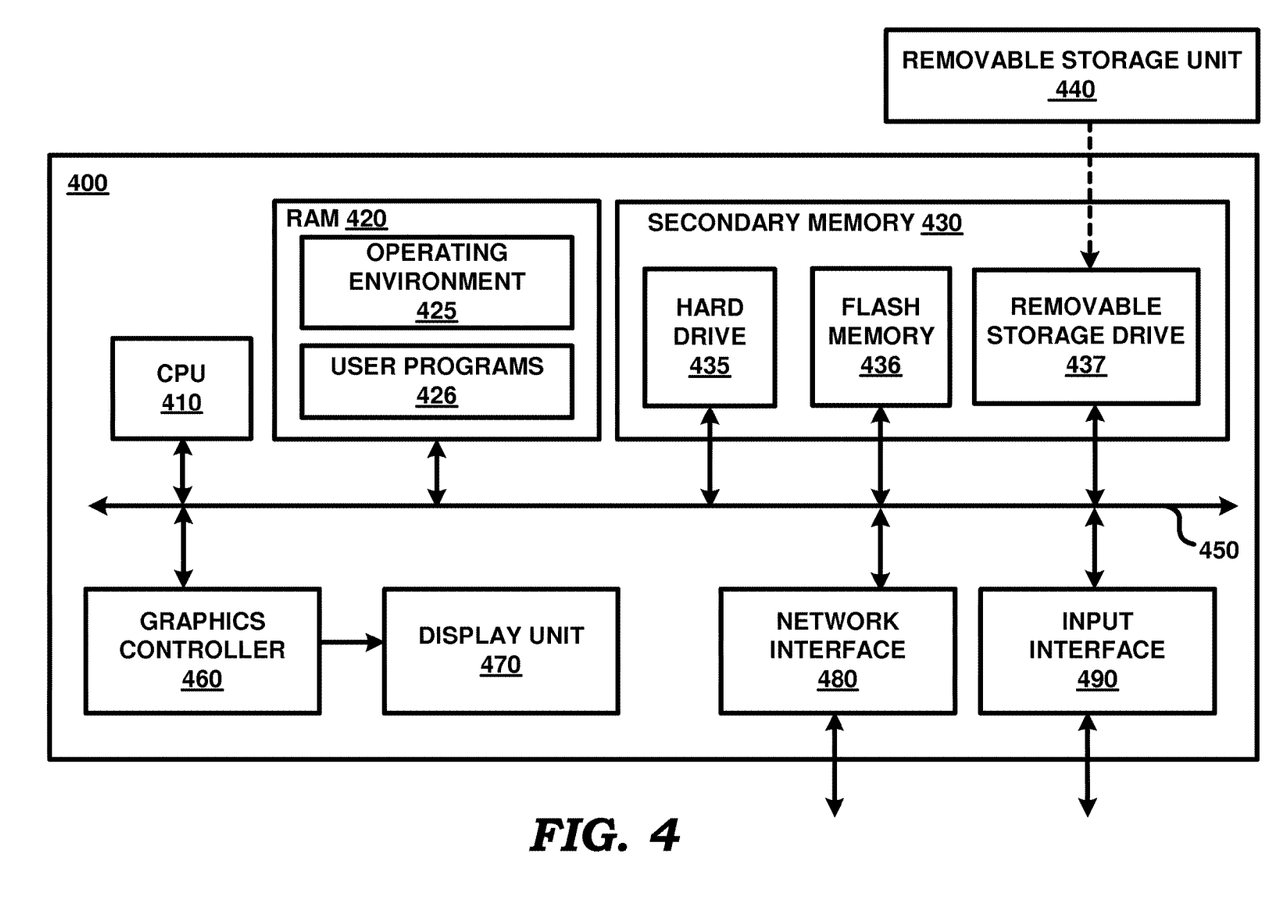
FIG. 4 is a block diagram illustrating the details of a digital processing system in which several aspects of the present invention are operative by execution of appropriate software instructions.

FIG. 4 is a block diagram illustrating the details of digital processing system 400 in which various aspects of the present invention are operative by execution of appropriate executable modules. Digital processing system 400 may correspond to server system 140. Digital processing system 400 may contain one or more processors (such as a central processing unit (CPU) 410), random access memory (RAM) 420, secondary memory 430, graphics controller 460, display unit 470, network interface 480, and input/output interface 490. All the components except display unit 470 may communicate with each other over communication path 450, which may contain several buses as is well known in the relevant arts.

CPU 410 may execute instructions stored in RAM 420 (which also includes RAM 145) to provide several features of the present invention. CPU 410 may contain multiple processing units, with each processing unit potentially being designed for a specific task. Alternatively, CPU 410 may contain only a single general-purpose processing unit.

RAM 420 may receive instructions from secondary memory 430 using communication path 450. RAM 420 is shown currently containing software instructions constituting shared environment 425 and/or user programs 426 (which include application 420 of FIG. 4 when system 400 represents server system 130). Shared environment 425 contains utilities shared by user programs, and such shared utilities include operating system, JVM 330, device drivers, etc., which provide a (common) run-time environment for execution of user programs/applications (including 340).

Graphics controller 460 generates display signals (e.g., in RGB format) to display unit 470 based on data/instructions received from CPU 410. Display unit 470 contains a display screen to display the images defined by the display signals. Input/output interface 490 includes input as well as output devices to enable a user to interact with system 400, and thus provides the basis for user interface 390 as well. Network interface 480 corresponds to network interface 360.

Secondary memory 430 (representing a non-transitory storage/medium) may contain hard drive 435, flash memory 436, and removable storage drive 437. Secondary memory 430 may store data (e.g., audit trail data for critical requests) and software instructions (for example, for performing the steps of FIG. 2), which enable digital processing system 400 to provide several features in accordance with the present invention.

Some or all of the data and instructions may be provided on removable storage unit 440, and the data and instructions may be read and provided by removable storage drive 437 to CPU 410. Floppy drive, magnetic tape drive, CD-ROM drive, DVD Drive, Flash memory, removable memory chip (PCMCIA Card, EPROM) are examples of such removable storage drive 437.

Removable storage unit 440 may be implemented using medium and storage format compatible with removable storage drive 437 such that removable storage drive 437 can read the data and instructions. Thus, removable storage unit 440 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 430. These computer program products are means for providing software to digital processing system 400. CPU 410 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of capturing audit trail data related to processing of requests, said method being performed in a server system providing access to a plurality of electronic objects, said method comprising:

receiving a plurality of requests, with processing of each request requiring access to a corresponding set of electronic objects of said plurality of electronic objects provided access to by said server system;

classifying each of said plurality of requests into one of a first category and a second category, wherein a first set of requests of said plurality of requests are classified into said first category in view of each of said first set of requests being a write request modifying one or more of said corresponding set of electronic objects, and wherein a second set of requests of said plurality of requests are classified into said second category in view of each of said second set of requests being a read request for one or more of said corresponding set of electronic objects;

processing each of said plurality of requests by performing corresponding tasks by accessing the corresponding set of electronic objects of said plurality of electronic objects, wherein audit trail data is formed in relation to performance of the corresponding tasks, wherein said audit trail data for each request comprises details of accessing the corresponding set of electronic objects during said processing of the request;

for each write request of said first set of requests classified in said first category, storing the audit trail data corresponding to the write request directly into a first database system upon said processing of the write request, and later transferring the audit trail data corresponding to the write request to a second database system from said first database system, wherein said first database system is according to a first schema and said second database system is according to a second schema, wherein each of said first database system and said second database system is designed to facilitate storing of said audit trail data using SQL (structured query language) queries, wherein said second schema specifies primary and foreign key constraints, which are not specified in said first schema, wherein said storing first stores the audit trail data corresponding to each write request of said first set of requests in said first database system without enforcing said constraints due to said first schema not specifying said constraints, wherein said transferring to said second database system causes said constraints to be enforced in said second database system; and for each read request of said second set of requests classified in said second category, storing the audit trail data corresponding to the read request first into a volatile memory upon said processing of the read request and then copying the audit trail data corresponding to the read request from said volatile memory to said second database system.

2. The method of claim 1, wherein said copying copies the audit trail data for each read request of said second set of requests from said volatile memory to said second database system upon lapse of a pre-specified duration since previous copying or when the data stored in said volatile memory exceeds a pre-specified threshold, and wherein said copying copies the audit trail data for each write request of said first set of requests from said first database system to said second database system only upon lapse of a corresponding pre-specified duration since previous copying.

3. The method of claim 2, further comprising generating reports, covering both of said first set of requests and said second set of requests, based on the audit trail data stored in said second database system.

4. The method of claim 1, wherein said classifying comprises:

determining whether each of said plurality of requests can be classified into said first category; and including the request in said first set of requests if said determining determines that the request can be classified into said first category, and in said second set of requests otherwise.

5. A non-transitory computer readable medium carrying one or more sequences of instructions for causing a server system to capture audit trail data related to processing of requests, said server system providing access to a plurality of electronic objects, wherein execution of said one or more instructions by one or more processors contained in said server system causes said server system to perform the actions of:

receiving a plurality of requests, with processing of each request requiring access to a corresponding set of electronic objects of said plurality of electronic objects provided access to by said server system;

classifying each of said plurality of requests into one of a first category and a second category, wherein a first set of requests of said plurality of requests are classified into said first category in view of each of said first set of requests being a write request modifying one or more of said corresponding set of electronic objects, and wherein a second set of requests of said plurality of requests are classified into said second category in view of each of said second set of requests being a read request for one or more of on said corresponding set of electronic objects;

processing each of said plurality of requests by performing corresponding tasks by accessing the corresponding set of electronic objects of said plurality of electronic objects, wherein audit trail data is formed in relation to performance of the corresponding tasks, wherein said audit trail data for each request comprises details of accessing the corresponding set of electronic objects during said processing of the request;

for each write request of said first set of requests classified in said first category, storing the audit trail data corresponding to the write request directly into a first database system upon said processing of the request, and later transferring the audit trail data corresponding to the request to a second database system from said first database system, wherein said first database system is according to a first schema and said second database system is according to a second schema, wherein each of said first database system and said second database system is designed to facilitate storing of said audit trail data using SQL (structured query language) queries, wherein said second schema specifies primary and foreign key constraints, which are not specified in said first schema, wherein said storing first stores the audit trail data corresponding to each write request of said first set of requests in said first database system without enforcing said constraints due to said first schema not specifying said constraints, wherein said transferring to said second database system causes said constraints to be enforced in said second database system; and for each read request of said second set of requests classified in said second category, storing the audit trail data corresponding to the read request first into a volatile memory upon said processing of the read request and then copying the audit trail data corresponding to the read request from said volatile memory to said second database system.

6. The non-transitory computer readable medium of claim 5, wherein said copying copies the audit trail data for each read request of said second set of requests from said volatile memory to said second database system upon lapse of a pre-specified duration since previous copying or when the data stored in said volatile memory exceeds a pre-specified threshold, and wherein said copying copies the audit trail data for each write request of said first set of requests from said first database system to said second database system only upon lapse of a corresponding pre-specified duration since previous copying.

7. A server system comprising:
a memory to store instructions;
a processor to retrieve said instructions and execute the retrieved instructions, wherein execution of said instructions causes said server system to perform the actions of:
receiving a plurality of requests, with processing of each request requiring access to a corresponding set of electronic objects of a plurality of electronic objects provided access to by said server system;
classifying each of said plurality of requests into one of a first category and a second category, wherein a first set of requests of said plurality of requests are classified into said first category in view of each of said first set of requests being a write request modifying one or more of said corresponding set of electronic objects, and wherein a second set of requests of said plurality of requests are classified into said second category in view of each of said second set of requests being a read request for one or more of said corresponding set of electronic objects;
processing each of said plurality of requests by performing corresponding tasks by accessing the corresponding set of electronic objects of said plurality of electronic objects,
wherein audit trail data is formed in relation to performance of the corresponding tasks, wherein said audit trail data for each request comprises details of accessing the corresponding set of electronic objects during said processing of the request;

for each write request of said first set of requests classified in said first category, storing the audit trail data corresponding to the write request directly into a first database system upon said processing of the write request, and later transferring the audit trail data corresponding to the write request to a second database system from said first database system, wherein said first database system is according to a first schema and said second database system is according to a second schema, wherein each of said first database system and said second database system is designed to facilitate storing of said audit trail data using SQL (structured query language) queries, wherein said second schema specifies primary and foreign key constraints, which are not specified in said first schema, wherein said storing first stores the audit trail data corresponding to each write request of said first set of requests in said first database system without enforcing said constraints due to said first schema not specifying said constraints, wherein said transferring to said second database system causes said constraints to be enforced in said second database system; and for each read request of said second set of requests classified in said second category, storing the audit trail data corresponding to the read request first into a volatile memory upon said processing of the read request and then copying the audit trail data corresponding to the read request from said volatile memory to said second database system.

8. The server system of claim 7, wherein said server system copies the audit data for each read request of said second set of requests from said volatile memory to said second database system upon lapse of a pre-specified duration since previous copying or when the data stored in said volatile memory exceeds a pre-specified threshold, and wherein said server system copies the audit trail data for each write request of said first set of requests from said first database system to said second database system only upon lapse of a corresponding pre-specified duration since previous copying.

9. The method of claim 1, wherein audit trail data for multiple read requests of said second set of requests is stored in said volatile memory before said copying is performed in a batch mode to said second database system, wherein said volatile memory is reused for storing audit trail data for later received ones of said second set of requests.

10. The non-transitory computer readable medium of claim 5, wherein audit trail data for multiple read requests of said second set of requests is stored in said volatile memory before said copying is performed in a batch mode to said second database system, wherein said volatile memory is reused for storing audit trail data for later received ones of said second set of requests.

11. The server system of claim 7, wherein audit trail data for multiple read requests of said second set of requests is stored in said volatile memory before said copying is performed in a batch mode to said second database system, wherein said volatile memory is reused for storing audit trail data for later received ones of said second set of requests.

12. The non-transitory computer readable medium of claim 5, wherein said copying copies the audit trail data for each read request of said second set of requests from said volatile memory to said second database system upon lapse of a pre-specified duration since previous copying or when the data stored in said volatile memory exceeds a pre-specified threshold, and wherein said audit trail data for each write request of said first set of requests is copied from said first database system to said second database system only upon lapse of a corresponding pre-specified duration since previous copying.

* * * * *